(No Model.)
E. R. PROCTER.
NUT LOCK.
No. 333,155. Patented Dec. 29, 1885.
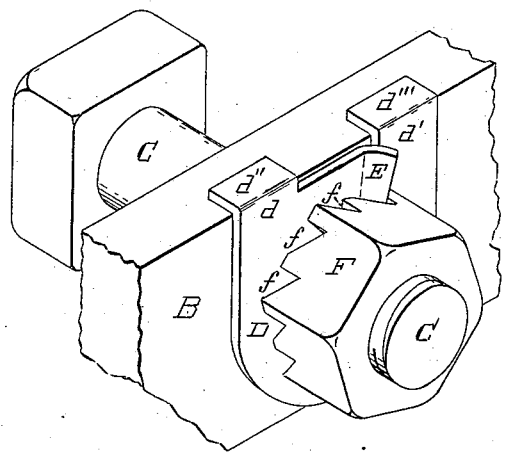
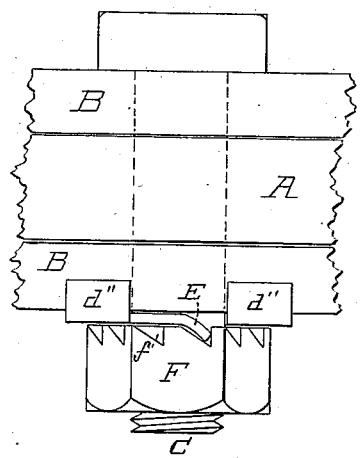
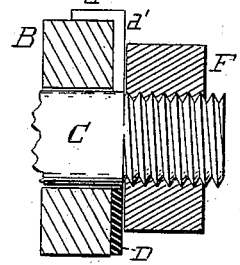
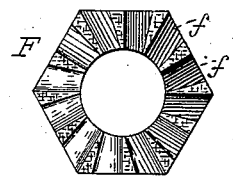
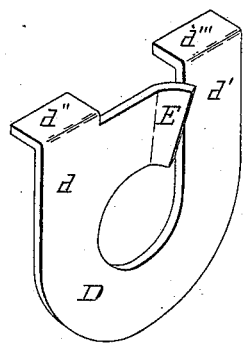
Attest:
Q. P. Knight.
Geo. L. Wheelock.
Inventor:
Edwin R. Procter
By Knight Bros. attys.

UNITED STATES PATENT OFFICE.

EDWIN R. PROCTER, OF WASHINGTON COURT-HOUSE, OHIO.

NUT-LOCK.

SPECIFICATION forming part of Letters Patent No. 333,155, dated December 29, 1885.

Application filed February 26, 1885. Serial No. 157,125. (No model.)

*To all whom it may concern:*

Be it known that I, EDWIN R. PROCTER, of Washington Court-House, Fayette county, Ohio, have invented a new and useful Improvement in Nut-Locks, of which the following is a specification.

My invention is an improvement in the class of devices for the secure retention of screw-nuts to their bolts, and for prevention of their becoming loosened or detached either by jarring action of the structure they are designed to fasten or by the instrumentality of mischievous persons.

My improvement is more particularly designed for and is illustrated in connection with screw-bolts, nuts, washers, and fish bars or plates, such as are employed to fasten end to end the abutting extremities of the consecutive rails of a railway.

In the accompanying drawings, Figures 1, 2, and 3 are respectively a perspective view, a top view, and an axial section, in which my improvement is shown applied to the fish-bar fastening of a railway. Fig. 4 is a sole side or rear view of the nut. Fig. 5 represents the washer.

A may represent a portion of a rail or other object to be fastened.

B may represent a portion of a customary fish bar or plate.

C may represent a customary screw-bolt.

D is a washer having two prongs, $d\ d'$, which, extending upward, terminate in lips $d''\ d'''$, which, by resting upon the top edge of the fish-plate, oppose rotation of the washer. A portion of the material of the washer partially separated in forming the prongs $d\ d'$ is curved outward to constitute a spring-tooth, E, which, by engaging in one of a series of ratchet-notches, $f$, in the sole of the nut F, operates to prevent retrograde rotation of the latter.

The washer D $d\ d'\ d''\ d'''$ is preferably composed of steel, and its lipped prongs may be of any length to suit the form and dimensions of the object to be fastend. The notches $f$ of the nut are preferably slightly oblique to the radial direction, and the tooth E of corresponding obliquity, as shown in Figs. 1 and 4.

I am aware that some washers of railway-joints have had lips or flanges which have engaged over the top of the fish-plate to prevent rotation of such washer, and that other washers of railway-joints have been formed with teeth or spurs to occupy indentations in the nut and prevent retrograde rotation thereof. I therefore disclaim invention in such features, broadly or separately considered.

I claim herein as new and of my invention—

1. The nut-lock consisting of the combination, with a screw-bolt and fish-plate, of the washer D, having the two prongs $d\ d'$, which terminate in lips $d''\ d'''$, and having the outcurved spring-tooth E, and of the nut F, having the ratchet-notches $f$ in its sole, substantially as and for the purposes set forth.

2. The combination, with ratcheted screw-nut F $f$, of the washer D, having the prongs $d\ d'$, terminating in the lips $d''\ d'''$, and the outcurved spring-tooth E, substantially as and for the purpose set forth.

3. The combination, with the bolt and nut, of a washer, D, having the two prongs $d\ d'$, terminating in the rectangularly-bent lips or hooks $d''\ d'''$, and having a tooth for engaging with the nut, substantially as set forth.

4. In a nut-lock, the washer D, having the prongs $d\ d'$, terminating in lips $d''\ d'''$, and having projecting from prong $d$ the outcurved spring tooth or pawl E, as and for the purposes set forth.

In testimony of which invention I hereunto set my hand.

EDWIN R. PROCTER.

Attest:
A. P. KNIGHT,
C. E. PRIOR.